United States Patent
Stucki et al.

(10) Patent No.: US 9,624,586 B2
(45) Date of Patent: Apr. 18, 2017

(54) ELECTROLYSIS CELL AND METHOD FOR OPERATING AN ELECTROLYSIS CELL

(71) Applicants: Samuel Stucki, Nussbaumen (CH); Dirk Schulze, Bonn (DE)

(72) Inventors: Samuel Stucki, Nussbaumen (CH); Dirk Schulze, Bonn (DE)

(73) Assignee: Innovatec Gerätetechnik GmbH, Rheinbach (DE)

( * ) Notice: Subject to any disclaimer, the term of this patent is extended or adjusted under 35 U.S.C. 154(b) by 0 days.

(21) Appl. No.: 14/807,515

(22) Filed: Jul. 23, 2015

(65) Prior Publication Data

US 2016/0040308 A1  Feb. 11, 2016

(30) Foreign Application Priority Data

Jul. 23, 2014 (DE) .................. 10 2014 110 422

(51) Int. Cl.
  *C25B 9/08* (2006.01)
  *C25B 1/10* (2006.01)
  *C25B 15/02* (2006.01)
  *C25B 1/18* (2006.01)
  *C25B 1/20* (2006.01)

(52) U.S. Cl.
  CPC ............ *C25B 9/08* (2013.01); *C25B 1/10* (2013.01); *C25B 1/18* (2013.01); *C25B 1/20* (2013.01); *C25B 15/02* (2013.01); *Y02E 60/366* (2013.01)

(58) Field of Classification Search
  CPC .............................................. C25B 1/02–1/12
  See application file for complete search history.

(56) References Cited

U.S. PATENT DOCUMENTS

| | | | |
|---|---|---|---|
| 4,627,897 A | 12/1986 | Tetzlaff et al. | |
| 5,989,741 A * | 11/1999 | Bloomfield | C25B 9/10 156/157 |
| 6,866,806 B2 * | 3/2005 | Andrews | C02F 1/4672 264/250 |
| 2006/0193758 A1 * | 8/2006 | Nam | C25B 1/13 422/186.1 |
| 2007/0151865 A1 * | 7/2007 | Shimko | C25B 1/10 205/628 |
| 2010/0320082 A1 * | 12/2010 | Kato | C25B 1/13 204/266 |

(Continued)

FOREIGN PATENT DOCUMENTS

| | | |
|---|---|---|
| DE | 3401637 A1 | 7/1985 |
| DE | 10 2009 004 031 A1 | 7/2010 |

(Continued)

*Primary Examiner* — Harry D Wilkins, III
(74) *Attorney, Agent, or Firm* — Pauley Erickson & Kottis

(57) ABSTRACT

An electrolysis cell, having an anode, a cathode, and a membrane that is situated between the anode and the cathode and contacts the anode via an anode contact area and contacts the cathode via a cathode contact area, wherein the cathode contact area is greater than the anode contact area, the membrane has a surface oriented toward the cathode that is greater than the cathode contact area, and the electrolysis cell has cathodically polarized surfaces that are in direct contact with the electrically conductive water. This invention also relates to a method for operating an electrolysis cell in natural water and a use of such an electrolysis cell for disinfecting water are also proposed.

27 Claims, 2 Drawing Sheets

(56) References Cited

U.S. PATENT DOCUMENTS

| | | |
|---|---|---|
| 2012/0000789 A1 | 1/2012 | Turek et al. |
| 2013/0015059 A1 * | 1/2013 | Haryu ........................ C25B 1/04 |
| | | 204/257 |
| 2015/0129419 A1 * | 5/2015 | Sekiguchi ............. C02F 1/4672 |
| | | 204/252 |

FOREIGN PATENT DOCUMENTS

| | | |
|---|---|---|
| JP | WO 2011/118482 A1 * | 9/2011 |
| JP | WO 2013/161699 A1 * | 10/2013 |

* cited by examiner

ELECTROLYSIS CELL AND METHOD FOR OPERATING AN ELECTROLYSIS CELL

BACKGROUND OF THE INVENTION

Field of the Invention

This invention relates to an electrolysis cell.

Discussion of Related Art

Electrolysis cells of this kind are generally known and are disclosed, for example, by German Patent References DE 10 2009 004 031 A1 and DE 34 01 637 A1. Through electrolysis of water, oxidizing agents can be produced at suitably embodied anodes and can be used for oxidative treatment of the water or for disinfection of the water. The processes that occur at the electrodes during electrolysis of natural water, e.g. tap water, are predominately the oxidation and reduction of water:

$$\text{At the anode: } H_2O \rightarrow \tfrac{1}{2}O_2 + 2H^+ + 2e^- \quad (1)$$

$$\text{At the cathode: } 2H_2O + 2e^- \rightarrow H_2 + 2OH^- \quad (2)$$

In the water, the current is transported by the dissolved ions. When a flow of current occurs, a pH gradient builds up in the electrolysis cell (pH <7 at the anode, pH >7 at the cathode). The pH gradient causes alkaline earth carbonate and/or alkaline earth hydroxide to precipitate on the alkaline cathode ("calcification"). Because of the low ion concentrations and the resulting low conductivity, the electrolysis of natural water is limited in the practicable current densities.

Through the use of a cation exchange membrane as an electrolyte (proton exchange membrane=PEM), it is possible to increase by several orders of magnitude the practicable current density of an electrolysis cell operated in water and to produce oxygen in the form of $O_2$ and/or $O_3$ at the anode. The membrane in this case is contacted over its entire area on both sides by the porous electrodes (anode and cathode). The processes occurring at high current densities at the electrodes in this arrangement are comprised of:

$$\text{At the anode: } H_2O \rightarrow \tfrac{1}{3}O_3 + 2H^+ + 2e^-$$

$$\text{At the cathode: } 2H^+ + 2e^- \rightarrow H_2 \quad (3)$$

In the cation exchange membrane, the current is transported by protons (H+) in accordance with equations 1 and 3 and is not limited by the ion concentration in the water. Primarily, the conduction of current with protons, which are present in a high concentration in the membrane, produces no pH gradients. But since the membrane is in chemical equilibrium with the water, cations dissolved in the water migrate into the membrane through ion exchange with protons and accumulate there. Even if the portion of the current transported by dissolved cations in a membrane cell is far less than one percent, it can influence the behavior of the cell significantly. Cations being exchanged at the anode generate a proton surplus (=acidification), as occurs in the cell without a membrane. Thermodynamically, the discharging of protons of hydrogen is the preferred reaction at the cathode. The metal cations that have migrated into the membrane therefore accumulate in the vicinity of the cathode and after a threshold concentration in the membrane at the cathode is reached, can lead to the production of hydroxides according to reaction (2). The operation of such known cells is limited by the presence of hardness components dissolved in the water, such as $Ca^{2+}$ and $Mg^{2+}$ ions in the form of dissolved hydrogen carbonates. The hardness components precipitate onto the cathode in the form of carbonate and/or hydroxide and therefore result in coatings that increase ohmic resistance of the electrolysis cell and limit the economically practicable operating times of such cells in natural water to a few hours.

Various methods are known from the prior art that make it possible to operate such electrolysis cells in hard water (i.e. with a large quantity of dissolved hardness components) in an economical way. PCT Publication WO 2012/159 206 A1 discloses dissolving cathodically generated deposits by reversing the polarity of the cell. The electrodes used for this, however, are very expensive to manufacture and the method requires disadvantageously large electrode surfaces. The patent specification of European Patent Reference EP 1 649 080 B1 discloses a cell in which a pre-electrode made of wire mesh is situated between the cathode and the membrane. This cell, however, also disadvantageously leads to a cell voltage of greater than 20 V after 100 hundred hours of operation. Alternatively, it is known to use conventional softeners to soften a partial flow of the water that is to be treated, but this is very complex in terms of both operation and maintenance.

The known approaches to solving the problem are comparatively complex and rather inefficient. One object of this invention, therefore, is to provide an electrolysis cell that does not have the disadvantages of the prior art and in which it is possible to prevent the formation of a barrier layer on the cathode so that the electrolysis cell can be operated even with hard water, i.e. in the presence of large quantities of hardness components, and can therefore be reliably used in natural water for longer periods of time.

SUMMARY OF THE INVENTION

The above object and others are attained by an electrolysis cell described by this specification and the claims.

As proposed according to this invention, the cathode contact area is greater than the anode contact area, the membrane has a surface oriented toward the cathode that is larger than the cathode contact area, and the electrolysis cell has cathodically polarized surfaces that are in direct contact with the electrically conductive water. It is thus possible for at least a part of the current flow prevailing in the electrolysis cell, after crossing over into the membrane, to be first conveyed along the cathode contact area, entraining hardness components that are adhering to the cathode contact area, and next to the cathode, for it to cross over into the electrolytes, e.g. natural water, and from there, for it to be conveyed to the cathode or to the cathodically polarized surfaces that are in direct contact with the electrically conductive water.

This is dictated by the accumulating hardeners producing an electrical insulation that prevents charge carriers from crossing over directly into the cathode contact area. In this regard, a forced diversion along the cathode contact area into the electrically conductive water takes place and from there to the cathode or the cathodically polarized surfaces that are in direct contact with the electrically conductive water and function as auxiliary cathodes. This gives the electrolysis cell a self-cleaning function and automatically counteracts the previously inevitable accumulation of hardness components in a continuous fashion.

As part of this invention, a good function in water is achieved if the anode contact area has a length of at most 10 mm in at least one of its main axis directions.

According to one embodiment of this invention, the cathode is structured so that it has at least one contact protrusion, which is in contact with a surface of the membrane via a cathode contact subarea, with the cathode contact subareas combining to form the cathode contact area, and the surface of the membrane has at least one open region, which is in contact not with the at least one contact protrusion of the cathode, but with electrically conductive water.

The structured design of the cathode divides the ion flow generated by the electrolysis current into two partial flows so that one of the partial flows does not flow directly via the cathode contact subarea of the contact protrusion that is in contact with the membrane, but rather via the open region protruding beyond the cathode contact subarea and the conductive water, and is shunted to the cathode. This ion flow via the water or the water phase makes it possible to influence the dynamic solution equilibrium at the cathode through the removal of alkaline earth cations and makes it possible to reduce the thickness of the passivating layer, i.e. the barrier layer or coating. Primarily only loose deposits, for example of $CaCO_3$, form in the regions of the cathode that are not directly in contact with the membrane, which result in a voltage increase only after longer operating times and can easily be removed mechanically if necessary.

The division of the currents is implemented by the special structured design of the cathode. Of particular importance here is the ratio of the area that the contact protrusions contact in the region of the cathode contact subareas (also called "cathode contact area" below) of the membrane to the open area or to the total area of the membrane as well as the dimensions and geometric form of the at least one contact protrusion contacting the membrane. Thus, for example, the increase rate of the cell voltage can be reduced by 40 to 100 times in water with a hardness of approximately 16 German degrees. The optimal ratio of cathode contact area to membrane area or open area depends on the concentration of the hardness components dissolved in the water. Hardness components are, for example, $Ca^{2+}$ and $Mg^{2+}$ ions in the form of dissolved hydrogen carbonates. In an advantageous fashion, this invention can be technically implemented in numerous different cell designs and is not limited to particular designs such as a circular electrode geometry. The essential thing is that the ratio of the total cathode contact area to the membrane is embodied to be greater than the ratio of the total anode contact area to the membrane.

The electrolysis cell according to this invention can be used in a particularly efficient way for in-situ production of oxidizers in natural water that contains hardness components, in particular tap water. The membrane can, for example, be a perfluorinated cation exchange membrane, which is placed by a suitable pressing device, for example, between the cathode and the anode and is contacted by them.

The membrane is embodied as plate-shaped, i.e. the membrane extends essentially along a main plane so that the length and width of the membrane are essentially greater than the thickness of the membrane. The length is the dimension of the membrane in a so-called longitudinal direction and the thickness is the dimension of the membrane in a so-called vertical direction that is perpendicular to the longitudinal direction. The width of the membrane extends perpendicular to the longitudinal direction and the vertical direction in a width direction, which, like the longitudinal direction, extends in the main plane.

In the following, the terms "down," "up," "lower," and "upper" refer to positions with reference to the vertical direction. The terms "left" and "right" will be used below to refer to positions with reference to the longitudinal direction. When the term "cross-section" is used below, this means a section lying in the plane that is defined by the vertical direction and the longitudinal direction and is oriented perpendicular to the width direction. This invention is not limited, however, to the orientations mentioned. The person skilled in the art will instead recognize that inversions of the orientation mentioned as well as other modifications are possible.

The membrane has an upper surface and a lower surface. The upper surface contacts the cathode and the at least one contact protrusion in the region of the cathode contact area or the cathode contact subareas that make up the latter while the lower surface contacts the anode in the region of the anode contact area or the anode contact subareas that make up the latter. The surfaces of the membrane extend parallel to the main plane. The surfaces of the membrane are embodied as planar or flat.

Viewed in the vertical direction, the anode is situated under the membrane. With its anode contact area embodied on the surface, the anode contacts the lower surface of the membrane so that during operation of the electrolysis cell, when a correspondingly suitable supply voltage is provided, an ion flow is produced in a known way. Viewed in the vertical direction, the cathode or the contact protrusion is situated above the membrane. The cathode contact area and the cathode contact subareas of the at least one contact protrusion of the cathode are likewise embodied as planar or flat so that this cathode contact area extends parallel to the upper surface of the membrane.

Advantageous embodiments and modifications of this invention can be inferred from the remaining dependent claims and the description, taken in conjunction with the drawings.

In one exemplary embodiment, there can be a recessed or overlapping region of the surface of the cathode, which is spaced apart from the upper surface of the membrane. The recessed region is spaced apart such that no direct or immediate ion flow from the surface of the membrane into the recessed region of the surface of the cathode is possible. By contrast with the contact protrusion, there is thus no contact between the surface of the cathode and the surface of the membrane in the recessed region. This space is filled with the electrically conductive water. Consequently, ions from the membrane can only reach the recessed region of the surface of the cathode by traversing the water that is contained between the membrane and the recessed region during operation of the electrolysis cell.

According to an exemplary modification, the at least one contact protrusion or the cathode contact area is embodied as block-shaped or linear. The term "linear" is used here to mean that the contact protrusion is embodied as elongated, for example in a block shape. The contact protrusion can also be embodied as cruciform, i.e. composed of lines that cross each other.

According to another exemplary modification, the cathode contact area is circular and the at least one contact protrusion is embodied as cylindrical. It is also possible for the cathode to have a plurality of contact protrusions that are spaced apart from one another. The contact protrusions are spaced apart from one another in the longitudinal direction and/or width direction. It is thus advantageously possible to substantially reduce the formation of a coating. In particular, it is possible, for example, for the contact protrusions to be arranged in a grid-like pattern. The term "grid-like" is used here to mean that the contact protrusions are arranged, for example, in the form of a lattice.

The distance between adjacent contact protrusions can, for example, be at least 3 mm. According to another embodiment, they can be at least 6 mm. This permits a particularly efficient operation of the electrolysis cell because it is possible to extend the operating time of the electrolysis cell considerably.

The cathode contact subareas can be arranged and spaced apart in accordance with the spacing and arrangement of the contact protrusions of which they are composed.

According to another exemplary modification, the at least one contact protrusion is composed of a porous material. The at least one contact protrusion can be composed of a different material than the rest of the cathode. The cathode or the at least one contact protrusion can, for example, be composed of a porous, catholically resistant material (stainless steel, brass, graphite, etc.).

According to another exemplary embodiment, the electrolysis cell has a movable rake device for mechanically removing calcification deposits on the regions of the cathode that are spaced apart from the membrane. The term "rake device" is used here to mean a rake with tines that is inserted between the contact protrusions from above and whose tines remove the deposits on the cathode. It is thus advantageously possible to clean the electrolysis cell in a particularly simple way so that the service life of the electrolysis cell can be extended considerably.

According to another exemplary embodiment, the area of the at least one open region is greater than the area of the at least one contact region by a factor of 2 to 4. It is thus advantageously possible to efficiently reduce the increase in cell voltage.

According to another exemplary embodiment, the anode is likewise embodied as structured so that the anode has at least one lower contact protrusion, which contacts the lower surface of the membrane via an anode contact subarea, with the anode contact subareas combining to form the anode contact area, and the lower surface of the membrane has at least one lower open region, which is not in contact with the at least one lower contact protrusion of the anode.

Through this structured embodiment of the anode, it is advantageously possible to achieve a further improvement in the efficiency of the electrolysis cell. The above statements that apply to the lower contact protrusion of the anode also correspondingly apply to the contact protrusion of the cathode. Thus for the description of the structured anode, refer to the description of the structured cathode. In particular, there can also be a plurality of lower contact protrusions on the anode.

The anode or the lower contact protrusion can, for example, be composed of a porous, anodically resistant material (for example valve metal, titanium, tantalum, or niobium, with an electroactive coating composed of $PbO_2$, platinum metals and their oxides, or boron-doped diamond). The lower contact protrusion and the rest of the anode can be made of a different material. In particular, the anode or the lower contact protrusion can be made of a porous, passivating material, where an electrochemically active coating is applied to the region of the surface of the lower contact protrusion, which is in direct contact with the membrane. Electrically conductive and anodically stable catalytic coatings are applied to the anode contact area.

According to another exemplary embodiment, the electrolysis cell has cathodically polarized surfaces that are in direct contact with the electrically conductive water. Such surfaces can, for example, be recessed surfaces or overlapping surfaces of the cathode that protrude beyond the contact protrusion.

The method according to this invention for operating an electrolysis cell in natural water is based on immersing the electrolysis cell, which has an anode, a cathode, and a membrane situated between the anode and cathode, which contacts the anode via an anode contact area and contacts the cathode via a cathode contact area, and in the natural water and applying an electrical voltage to the anode (5) and cathode (2), which produces a current flow from the anode (5) to the cathode (2) via the membrane (4).

In order to counteract the depositing of inevitably settling hardness components from the water on the cathode, according to a proposal of this invention, at least a part of the current flow, after crossing over into the membrane, is first conveyed along the cathode contact area, entraining hardness components adhering to the cathode contact area and next to the cathode, crosses over into the natural water, and is conveyed from there to the cathode. This guidance of the current flow and entrainment of the hardness components occurs in a forced fashion because the adhering hardness components in the region of the cathode contact area gradually form an electrical insulating layer around which the charge carriers are forcibly guided because of the potential difference prevailing in the electrolysis cell.

In this way, the electrolysis cell automatically cleans itself and there is no drop in performance due to the hardness components since they are no longer deposited in the cathode contact area.

According to another exemplary embodiment, the gases forming at the anode and cathode are dissolved directly into the water and are not separated physically. Alternatively, it is possible for the gases forming at the anode and cathode to be separated physically by the membrane and possibly assisted by a suitable flow guidance of the water.

The electrolysis cell is operated in a vessel with water, for example at a current density of 0.5 to 1.5 $A/cm^2$.

Another subject of this invention involves the use of an electrolysis cell according to one of the previously described embodiments for disinfecting water, in particular spring water and/or drinking water. Otherwise, refer to the descriptions above. With the use of this electrolysis cell, it is possible to generate ozone at the anode (ozone generator). The generated ozone kills germs, for example, in the water, making it possible to achieve an efficient disinfection of the water.

Exemplary embodiments of this invention are shown in the drawings and described in greater detail in the description below.

DETAILED DESCRIPTION OF THE INVENTION

Figure 1:
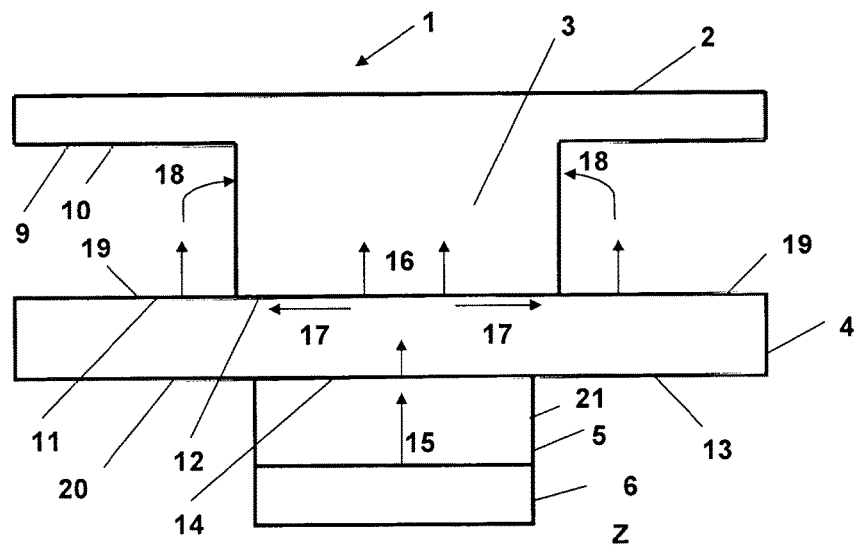
FIG. 1 schematically shows an electrolysis cell according to an exemplary embodiment of this invention.

In the figures, parts that are the same are consistently provided with the same reference numerals and are therefore as a rule named and/or mentioned only once.

FIG. 1 schematically shows a cross-section taken through an electrolysis cell 1 according to an exemplary embodiment of this invention. The electrolysis cell 1 has a cathode 2 situated or positioned at the top in the vertical direction Z. The cathode 2 has a cathode surface 9, which is oriented toward a membrane 4 situated or positioned under the cathode 2. The cathode surface 9 is provided with a porous contact protrusion 3. Viewed in the longitudinal direction X, to the left and right of the contact protrusion 3, the cathode surface 9 has a recessed spacing region 10. In other words, this spacing region 10 is recessed upward in comparison to the contact protrusion 3 and is in direct contact with the surrounding electrically conductive water.

The flat membrane 4 is situated or positioned under the cathode 2. The membrane 4 is embodied in the form of a plate. The membrane 4 has an upper surface 11, which is oriented toward the cathode 2. The membrane 4 has a lower surface 13 which is oriented toward an anode 5. The membrane 4 is arranged so that its surfaces 11, 13 are oriented perpendicular to the vertical direction Z and parallel to the longitudinal direction X. On the upper surface 11, the membrane 4 contacts and is connected to the contact protrusion 3. This contact is composed of or comprises a cathode contact area 12 on a subarea of the membrane surface.

The porous anode 5 is situated or positioned under the membrane 4. The entire upper surface of the anode 5 contacts the lower surface 13 of the membrane 4, forming a lower anode contact area 14. An anode power supply 6 is situated or positioned under the anode 5 and serves in a known way as a power supply for the anode 5.

In the exemplary embodiment shown, the anode contact area 14 and the cathode contact area 12 are embodied as round. It is clear that the cathode contact area 12 is embodied as slightly larger than the anode contact area 14.

If the electrolysis cell 1 is now switched into operation, then the anode power supply 6 supplies current to the anode 5. The electrolysis cell 1 is operated, for example, in a vessel containing natural water (tap water), for example at a current density of 0.5 to 1.5 A/cm², and an ion flow or current flow from the anode 5 via the anode contact area 14 into the membrane 4 is produced (see arrow 15). The ion flow first flows via the cathode contact area 12 directly into the contact protrusion 3 of the cathode 2 (see arrow 16). As operating time increases, however, hardness components gradually accumulate on the cathode contact area, which function as an insulation layer. As a result, only part of the ion flow travels from the membrane 4 via the cathode contact area 12 directly into the contact protrusion 3 of the cathode 2 (see arrow 16). Another part of the ion flow, however, first flows according to arrow 17 along the cathode contact area 12 until it arrives in a region next to or near the contact protrusion 3. From there, the ion flow travels starting from the surface 11 of the membrane 4 via the water between the recessed region 10 and the membrane 4, and into the cathode 2, bypassing at least some regions of the contact protrusion 3 (see arrow 18). An excessive coating between the membrane 4 and the contact protrusion 3 can thus be advantageously prevented from forming or can be removed since any adhering hardness components on the cathode contact area 12 are entrained by the partial (ion) flow indicated by arrow 17 and are conveyed into the surrounding water.

Figure 2:
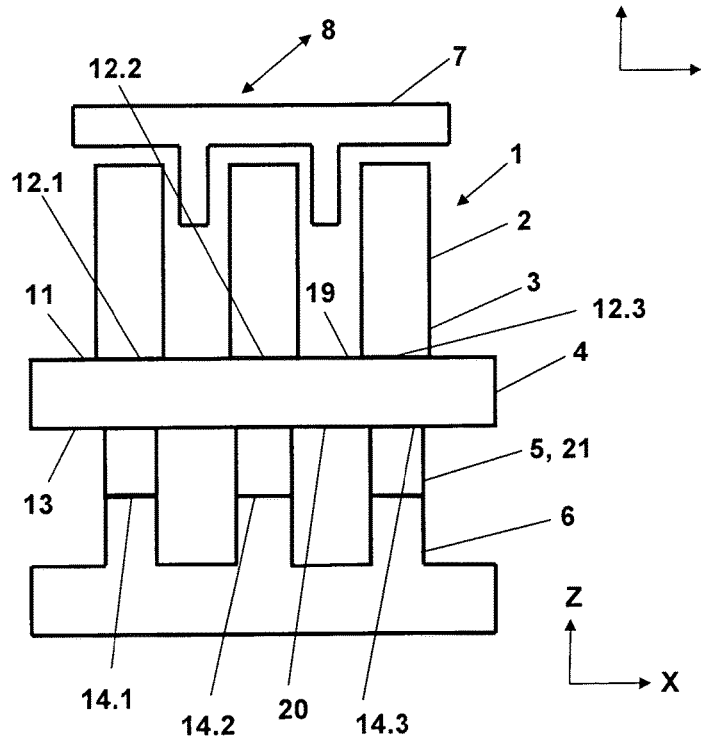
FIG. 2 schematically shows an electrolysis cell according to another exemplary embodiment.

FIG. 2 schematically shows a cross-section through an electrolysis cell 1 according to another exemplary embodiment of this invention. In this embodiment, the cathode 2 has a plurality of porous contact protrusions 3, which are embodied in an elongated or linear form. In FIG. 2, three contact protrusions 3 are shown, but the cathode 2 can have even more contact protrusions. Each contact protrusion 3 contacts the surface of the membrane 4 in a cathode contact subarea 12.1, 12.2, 12.3. All of the cathode contact subareas 12.1, 12.2, 12.3 combine to form the effective cathode contact area 12. The contact protrusions 3 are spaced apart from one another in the longitudinal direction X.

The porous anode 5 is situated or positioned under the membrane 4. In this exemplary embodiment, the surface of the anode 5 is also embodied as structured and has lower contact protrusions 21, which are in contact with the lower surface 13 of the membrane 4 in the anode contact subareas 14.1, 14.2, 14.3. All of the anode contact subareas 14.1, 14.2, 14.3 combine to form the effective anode contact area 14. The lower contact protrusions 21 are likewise embodied as elongated and are dimensioned so that the anode contact area 14 is smaller than the cathode contact area 12. The length of the contact protrusions 21 visible in the drawing and the length of the anode contact subareas 14.1, 14.2, 14.3 constituted by them in the direction of the main axis X is at most 10 mm. The lower contact protrusions 21 are spaced apart from each other in the direction X. This leaves open regions 20 on the lower surface 13 of the membrane 4 that are not contacted by the anode 5. In addition, the electrolysis cell 1 has a power supply 6 for the anode 5.

If the electrolysis cell 1 is now operated in a container with water, for example at a current density of 0.5 to 1.5 A/cm², then in a fashion corresponding to the one in FIG. 1, an ion flow from the porous anode 5 via the porous lower contact protrusions 21 into the membrane 4 takes place. The ions flow from the membrane 4 partially via the cathode contact subareas 12.1, 12.2, 12.3 into the porous contact protrusions 3 of the cathode 2. In addition, part of the ions flow between the contact protrusions 3, through the water situated there, and toward the upper region of the contact protrusions 3. In the upper region of the electrolysis cell 1, a rake 7 is provided, which can be moved perpendicular to the vertical direction Z and longitudinal direction X (see double arrow 8) so that its tines can remove deposits between the contact protrusions 3 on the cathode 2. Otherwise, refer to the explanations with regard to FIG. 1.

Figure 3:
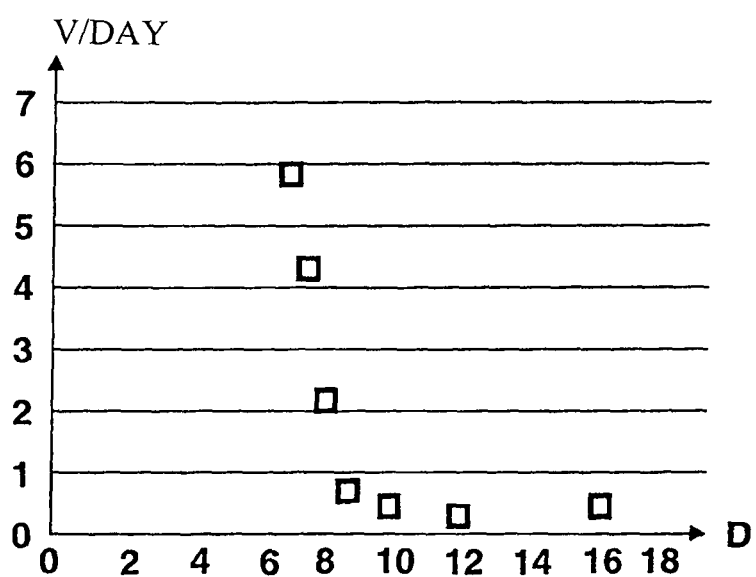
FIG. 3 shows a schematic graph in which an average cell voltage increase is plotted for different membrane diameters.

FIG. 3 depicts a schematic graph in which the average cell voltage increase V/day (vertical axis) is plotted for different membrane diameters D (horizontal axis). FIG. 3 shows a plot of the average cell voltage increase V/day over a respective run time of 2 to 6 days. In this exemplary embodiment, which principally corresponds to the exemplary embodiment in FIG. 1, a perfluorinated cation exchange membrane 4 cut into a circle (diameter D in mm) was contacted with a porous, circular anode 5 made of titanium, with a diameter of 5 mm, with a surface on the membrane side, i.e. in the contact region, that is coated with $PbO_2$, and a porous cathode 2 made of stainless steel (with a diameter of the circular contact protrusion of 3 to 7 mm). The electrolysis cell 1 thus formed was operated in a vessel containing 250 ml water with a content of more than 73 mg/liter calcium and more than 12 mg/liter magnesium at a current density of 1 A/square centimeter. The water composition in the vessel was kept constant through a continuous addition of fresh water (200 ml/h). The cell voltage was measured as a function of the operating time. The experiment was repeated with a series of cells 1 whose design was identical except for the area of the circular membrane used. The membrane diameter in this repeated experiment was varied between 7 mm and 16 mm. The average cell voltage increase V/day turns out to depend on the diameter D of the membrane 4 used.

FIG. 3 shows that with a diameter D of 7 mm of the membrane 4, the average cell voltage increase V/day equals 6 V. With increasing diameter D, the average cell voltage increase V/day drops to a value of less than 1 V, which is achieved between 9 and 16 mm. The increase of the diameter D of the membrane 4, i.e. the increase of the open region or the open area 19 or 20, consequently yields a significant drop in the average cell voltage increase V/day from 6 V to less than 1 V.

For the sake of completeness, it should be noted that the exemplary embodiments described above are only intended for illustrating this invention. In no way is the subject of this invention limited by the exemplary embodiments described.

German Patent Application DE 10 2014 110 422.6, filed 23 Jul. 2014, the priority document corresponding to this invention, to which a foreign priority benefit is claimed under Title 35, United States Code, Section 119, and its entire teachings are incorporated, by reference, into this specification.

What is claimed is:

1. An electrolysis cell (1) having an anode (5), a cathode (2), and a membrane (4) positioned between the anode (5) and the cathode (2) and contacting the anode (5) via an anode contact area (14) and contacting the cathode (2) via a cathode contact area (12), the electrolysis cell comprising the cathode contact area (12) being greater than the anode contact area (14), the membrane (4) having a surface (11) oriented toward the cathode (2) which is greater than the cathode contact area (12), and the electrolysis cell (1) having cathodically polarized surfaces in direct contact with the electrically conductive water, wherein the cathode (2) is structured so that the cathode (2) has at least one contact protrusion (3), which contacts a surface (11) of the membrane (4) via a cathode contact subarea (12.1, 12.2, 12.3), with the cathode contact subareas (12.1, 12.2, 12.3) combining to form the cathode contact area (12), and the surface (11) of the membrane (4) has at least one open region (19) which is not in contact with the at least one contact protrusion (3) of the cathode (2).

2. The electrolysis cell according to claim 1, wherein the anode contact area (14) has a length of at most 10 mm in at least one of its main axis directions.

3. The electrolysis cell (1) according to claim 2, wherein the at least one contact protrusion (3) is block-shaped.

4. The electrolysis cell (1) according to claim 1, wherein the cathode contact area (12) is circular.

5. The electrolysis cell (1) according to claim 4, wherein the cathode (2) has a plurality of contact protrusions (3) that are spaced apart from one another.

6. The electrolysis cell (1) according to claim 5, wherein the contact protrusions (3) are arranged in a grid-like pattern.

7. The electrolysis cell (1) according to claim 6, wherein a distance between adjacent contact protrusions is at least 3 mm.

8. The electrolysis cell (1) according to claim 5, wherein a distance between adjacent contact protrusions is at least 6 mm.

9. The electrolysis cell (1) according to claim 8, wherein the at least one contact protrusion (3) is made of a porous material.

10. The electrolysis cell (1) according to claim 9, wherein the electrolysis cell (1) has a moving rake (7) for mechanical removal of calcification deposits on the cathode (2).

11. The electrolysis cell (1) according to claim 10, wherein the area of the at least one open region (19) is greater than the area of the at least one contact region (12) at least by a factor of 2 to 4.

12. The electrolysis cell (1) according to claim 11, wherein the anode (5) is embodied as structured so that the anode (5) has at least one lower contact protrusion (21), which contacts a lower surface (13) of the membrane (4) via an anode contact subarea (14.1, 14.2, 14.3), with the anode contact areas (14.1, 14.2, 14.3) combining to form the anode contact area (14), and the lower surface (13) of the membrane (4) has at least one lower open region (20), which is not in contact with the at least one lower contact protrusion (21) of the anode (5).

13. The electrolysis cell (1) according to claim 12, wherein the at least one lower contact protrusion (21) is produced from a porous, passivating material and an electrochemically active coating is applied to the anode contact subarea (14.1, 14.2, 14.3).

14. The electrolysis cell (1) according to claim 12, wherein the at least one lower contact protrusion (21) is produced from a valve steel and an electrically conductive, anodically stable catalytic coating is applied to the anode contact subarea (14.1, 14.2, 14.3).

15. The electrolysis cell (1) according to claim 1, wherein the cathode (2) has a plurality of contact protrusions (3) that are spaced apart from one another.

16. The electrolysis cell (1) according to claim 1, wherein the contact protrusions (3) are arranged in a grid-like pattern.

17. The electrolysis cell (1) according to claim 1, wherein a distance between adjacent contact protrusions is at least 3 mm.

18. The electrolysis cell (1) according to claim 1, wherein the at least one contact protrusion (3) is made of a porous material.

19. The electrolysis cell (1) according to claim 1, wherein the area of the at least one open region (19) is greater than the area of the at least one contact region (12) at least by a factor of 2 to 4.

20. The electrolysis cell (1) according to claim 1, wherein the electrolysis cell (1) has a moving rake (7) for mechanical removal of calcification deposits on the cathode (2).

21. The electrolysis cell (1) according to claim 1, wherein the anode (5) is embodied as structured so that the anode (5) has at least one lower contact protrusion (21), which contacts a lower surface (13) of the membrane (4) via an anode contact subarea (14.1, 14.2, 14.3), with the anode contact areas (14.1, 14.2, 14.3) combining to form the anode contact area (14), and the lower surface (13) of the membrane (4) has at least one lower open region (20), which is not in contact with the at least one lower contact protrusion (21) of the anode (5).

22. A method for operating the electrolysis cell (1) according to claim 1 in natural water, in which the electrolysis cell is immersed in the natural water and an electric voltage is applied to the anode (5) and the cathode (2), which produces a current flow from the anode (5) to the cathode (2) via the membrane (4), the method including the electrolysis cell (1) having cathodically polarized surfaces that are in direct contact with the electrically conductive water and at least a part of the current flow, after crossing over into the membrane (4), is first conveyed along the cathode contact area (12), entraining hardness components adhering to the cathode contact area, and next to the cathode (2), crossing over into the natural water and from there, is guided into the cathodically polarized surfaces of the cathode (2) that are in direct contact with the electrically conductive water.

23. The method according to claim 22, wherein the gases forming at the anode (5) and cathode (2) are physically separated by the membrane (4).

24. The method according to claim 23, wherein the electrolysis cell (1) is operated with a current density of 0.5 to 1.5 A/cm$^2$.

25. The method according to claim 22, wherein the electrolysis cell (1) is operated with a current density of 0.5 to 1.5 A/cm$^2$.

26. A method of using the electrolysis cell (1) according to claim 1, the method comprising using the electrolysis cell to disinfect water.

27. The method according to claim 26, wherein the water is spring water and/or drinking water.

* * * * *